United States Patent Office 3,071,437
Patented Jan. 1, 1963

3,071,437
PREPARATION OF HYDROGEN FLUORIDE
Charles C. Quarles, Crown Point, Ind., assignor to E. I. du Pont de Nemours and Company, Wilmington, Del., a corporation of Delaware
No Drawing. Filed Aug. 19, 1959, Ser. No. 834,651
1 Claim. (Cl. 23—153)

This invention relates to the manufacture of hydrogen fluoride and is particularly directed to processes in which a slurry of a metal fluoride in liquid hydrogen fluoride is reacted with a mineral acid such as sulfuric acid to produce hydrogen fluoride.

It is difficult to produce hydrogen fluoride by reaction of calcium fluoride with sulfuric acid according to prior art processes wherein sulfuric acid and the calcium fluoride are mixed and reacted in an externally heated retort (see Lawrence U.S. Patent No. 2,047,210), rotary kiln, or similar equipment. The mass becomes putty-like and is difficult to mix, and heat transfer into and through the mass is a serious problem. Because of the endothermic nature of the reaction, efficient heat transfer is of extreme importance.

It has been disclosed in Yacoe U.S. Patent No. 2,846,290 to conduct the reaction of calcium fluoride with sulfuric acid in a chlorobenzene slurry to improve heat transfer and mixing characteristics. However, the Yacoe process requires the use of an expensive reaction medium such that small yield losses render the process uneconomical. Therefore, elaborate recovery facilities are required to reduce chlorobenzene losses. As a result, a large investment in plant is required. An additional disadvantage of the Yacoe process is due to the occurrence of undesirable side reactions of the chlorobenzene that further penalize the process.

According to the present invention the reaction between the metal fluoride and the mineral acid is conducted in liquid hydrogen fluoride and the system is kept fluid so that heat exchange becomes no problem and there is no tendency for the calcium fluoride to become sticky, to form an unworkable mass, or to coat heat exchange surfaces and thereby interfere disadvantageously with efficient heat transfer.

In the process of this invention, hydrogen fluoride because of its low boiling point can be removed from the product calcium sulfate simply without elaborate recovery facilities. Also, because hydrogen fluoride is completely inert to reaction with sulfuric acid, no yield loss is encountered via side reactions as with other reaction media such as chlorobenzene.

The present process applies to the preparation of hydrogen fluoride from any alkali metal or alkaline earth metal fluoride. Because of its low cost, the mineral fluorspar, which is essentially calcium fluoride, is preferred. It will be understood that, wherever calcium fluoride is mentioned herein, the other metal fluorides can of course be used.

The calcium fluoride used can be any good grade of fluorspar. The commercially available "acid-grade" fluorspar is preferred because of its low silica content and it may be of any particle size normally used in the commercial production of hydrogen fluoride such as the acid-grade fluorspar characterized in the trade as "70% through 200 mesh," "77% through 200 mesh," etc. The fluorspar can be more finely divided by grinding if desired though there is no great advantage in this unless the particular product used is of unusually large size.

The sulfuric acid used is at least 90% $H_2SO_4$ and is preferably 95 to 100% $H_2SO_4$ when producing anhydrous hydrofluoric acid without extensive product concentrating facilities.

Instead of sulfuric acid, other acids such as phosphoric, fluorsulfonic and sodium hydrogen sulfate can be employed. However, these acids do not possess the advantages of sulfuric itself as indicated by Lawrence in U.S. Patent No. 2,047,210.

The hydrogen fluoride used can, of course, be that produced in the process. This can be supplemented with added hydrogen fluoride from an external source. The hydrogen fluoride is a usual commercial grade which can be liquefied by the application of suitable pressure under the conditions of the process.

According to the invention, a slurry of fluorspar is made by mixing it in liquid hydrogen fluoride. The temperature at the time of such mixing is preferably somewhat below the atmospheric boiling point of hydrogen fluoride, 20° C., and preferably the temperature is around 15° C. or thereabouts, though obviously this is not a matter of great importance and the mixing can be conducted under pressure and at higher temperatures if suitable equipment is available for this purpose.

The proportion of calcium fluoride is dispersed as a slurry and is not present as a fixed and unhandleable paste. There is no objection to using a great excess of hydrogen fluoride except of course the additional capacity required in the equipment for reaction and for subsequent condensation and recovery. Generally from about 10 to 70% by weight of fluorspar can be present in the liquid hydrogen fluoride but it is preferable to have from about 20 to 50% by weight.

To the slurry of calcium fluoride in liquid hydrogen fluoride there is added approximately a stoichiometric amount of sulfuric acid. The amount can be from a 0 to 10% excess or preferably from a 2 to 5% excess based on the conversion of the calcium fluoride to hydrogen fluoride and calcium sulfate. Of course, an excess of calcium fluoride can be used but generally the high cost of calcium fluoride compared to sulfuric acid favors the use of excess acid to realize a high conversion of the more expensive raw material.

The calcium fluoride is reacted with the sulfuric acid and at a temperature between about 100 and 230° C. Temperatures outside of this range can be used but the reaction proceeds very slowly below 100° C. and the pressures become increasingly less economic as higher temperatures are used. The pressure should be that which will keep the hydrogen fluoride in the liquid state and pressures at or slightly above the vapor pressure of hydrogen fluoride at the reaction temperature will normally be used.

It is to be noted with respect to temperature that it is preferred that the heat content of the system should be high enough so that when the whole system is released to atmospheric pressures there will be enough heat present to vaporize all of the hydrogen fluoride from the calcium sulfate. In this connection, however, it is to be noted that the solids can be separated from the liquid before releasing the pressure, thus minimizing the amount of heat which must be available to effect separation of hydrogen fluoride from solids. Solids can also be separated after pressure release and partial flashing.

The invention will be further described but is not intended to be limited by the following example illustrating one specific embodiment for carrying out the present process.

*Example*

To a slurry tank containing 217 pounds of liquid hydrogen fluoride and provided with a stirring means is added 217 pounds of calcium fluoride. The mixture is slurried by mixing. The slurry is pumped to a pressure of 400 p.s.i. Two hundred and eighty pounds of 99% sulfuric acid is also pumped to 400 pounds pressure and the two streams mixed and heated to about 150° C. by passing through a heat exchanger having a hold-up time of about 15 minutes.

The mixed stream is then passed through a pressure release valve and flashed at about atmospheric pressure in a cyclone separator. The calcium sulfate by-product is removed from the bottom of the cyclone and sent to a waste disposal facility. The hydrogen fluoride product is withdrawn from the cyclone and sent to a condenser where the hydrogen fluoride is liquefied and a portion of it returned to a similar operation. Gases not condensed in the condenser include some hydrogen fluoride, silicon tetrafluoride and other gaseous impurities. The hydrogen fluoride obtained from the condenser can be used without further purification or if a pure material is desired it can be further purified by distillation.

In another exemplary procedure, in a batch operation the calcium fluoride can be added to hydrogen fluoride and sulfuric acid, and the reaction vessel sealed. The mixture is then brought up to the desired temperature and to the autogenous pressure, and then the pressure released after the reaction is completed to effect a separation of products as in the above example.

The invention claimed is:

In a process for the preparation of hydrogen fluoride, the steps comprising (1) making a slurry of calcium fluoride in liquid hydrogen fluoride and (2) reacting said calcium fluoride with sulfuric acid at a temperature within the range between about 100 and 230° C. and a pressure sufficient to keep hydrogen fluoride in a liquid state.

References Cited in the file of this patent

UNITED STATES PATENTS 2,846,290     Yacoe _____ Aug. 5, 1958

OTHER REFERENCES

Supplement to Mellor's Comprehensive Treatise on Inorganic and Theoretical Chemistry, Supp. II, Part 1, 1956, pages 120 and 121, Longmans, Green & Co., N.Y.